July 27, 1943. H. L. STILES 2,325,434
MIXING DEVICE
Filed April 16, 1941
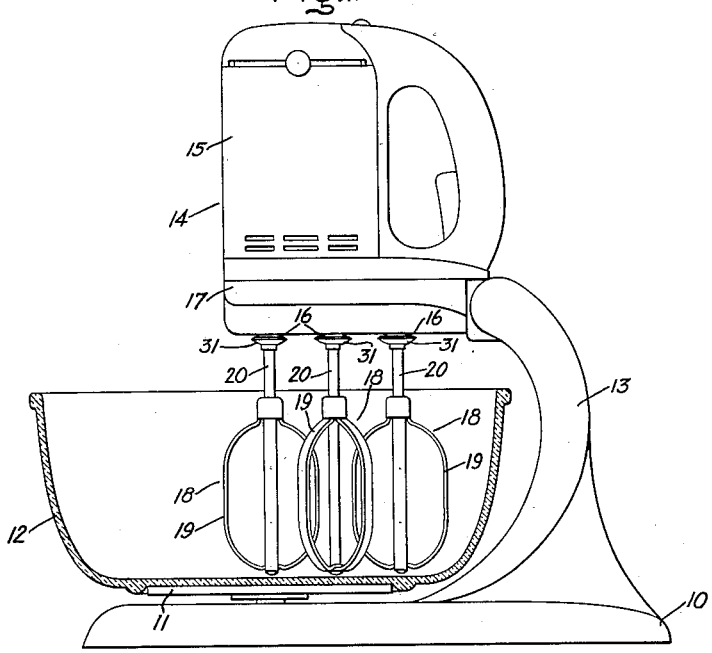
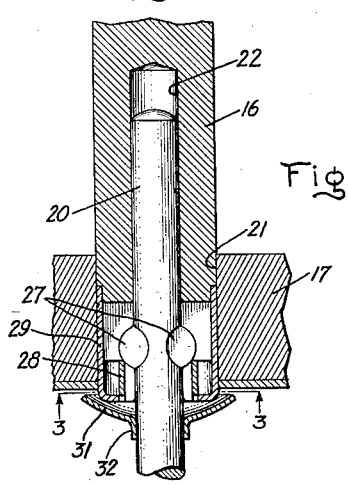
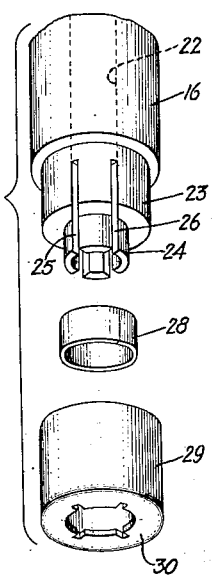
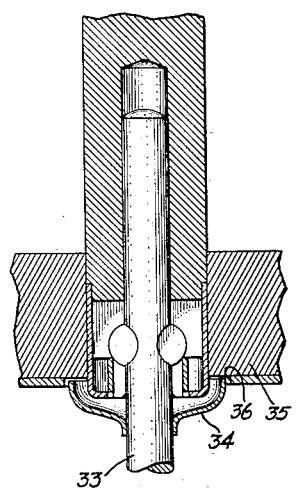
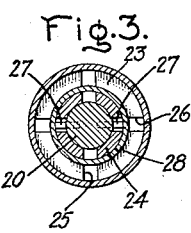
Inventor:
Harry L. Stiles,
by Harry E. Dunham
His Attorney.

Patented July 27, 1943

2,325,434

UNITED STATES PATENT OFFICE 2,325,434

MIXING DEVICE

Harry L. Stiles, Bridgeport, Conn., assignor to General Electric Company, a corporation of New York Application April 16, 1941, Serial No. 388,857

2 Claims. (Cl. 259—1)

This invention relates to mixing devices, more particularly to mixing devices for mixing batters and other food mixtures, beating eggs, whipping cream, etc., and it has for its object the provision of an improved device of this character.

This invention is particularly applicable to food mixing devices provided with a frame which supports a vertical driving spindle. The spindle supports and drives a vertically positioned beating tool. This beating tool has a shaft which is supported and driven by the spindle, and a beater element supported on the lower end of the shaft so as to operate in a bowl or vessel placed below the frame.

In devices of this character, there is a tendency for the food being mixed to work up the shaft. This is particularly true in the case of dough and heavy batters. At times, the dough and batter will climb the shaft and become attached to the driving spindle and associated mechanism. It is difficult to clean these parts with the result that eventually the food, which has dried, drops down into fresh food which is being mixed.

Guard means have been provided heretofore which were intended to prevent the travel of food up the shaft. These guards either have been located above the driving connection between the beater shaft and its driving spindle and hence afforded no protection to the spindle or the means connecting it with the shaft; or they have been located below this connection, but so low that the food mixture could travel about them and thence up the shaft to the spindle and connection means.

This invention contemplates the provision of an improved food mixer provided with a guard means constructed and arranged to cooperate with the frame and spindle in such a way as to prevent the food mixture from travelling up into the driving mechanism.

In accordance with this invention, suitable baffle-like guards are provided on the shafts of the beater tools attached to the shafts so as to rotate with them. These guards are located on the shafts below the spindle and the means connecting the spindles with the shafts, and also have a part that rotates directly below the lower wall of the frame so as to intercept food mixtures which travel up the shafts and prevent them from contacting the spindles.

In one embodiment of this invention, the guard is provided with upper and lower concave and convex walls respectively so that the guard assumes a cup-shape. This cupped member encloses the lower end of the spindle and its upper edge rotates so closely to the lower wall of the frame that food mixtures cannot possibly pass over and around the guard into the frame and spindle.

For a more complete understanding of this invention, reference should be had to the accompanying drawing in which Fig. 1 is a side elevation of a mixing device embodying this invention, a part of the device being shown in section; Fig. 2 is an enlarged fragmentary sectional view taken through a portion of the apparatus shown in Fig. 1 and illustrating the guard means arranged in accordance with this invention; Fig. 3 is a sectional view taken through the line 3—3 of Fig. 2 and looking in the direction of the arrows; Fig. 4 is an enlarged exploded view illustrating certain elements used in coupling the beater driving shaft with its driving spindle; and Fig. 5 is a view similar to Fig. 2, but illustrating a modified form of this invention.

Referring more particularly to Figs. 1-4, I have shown my invention in one form as applied to a food mixing device comprising a base 10 upon which is mounted a suitable turntable 11 which rotatably supports a mixing bowl 12. At one end, the right-hand end as viewed in Fig. 1, there is provided an upright standard 13 which supports a power unit 14. The power unit 14 comprises a driving motor 15 which is connected by gears (not shown) to a plurality of driving spindles 16, which are mounted in a gear frame 17 to rotate on spaced parallel vertical axes. The spindles 16 drive beaters 18, each of which is provided with a beating element 19 and a driving shaft 20 which supports the beating element and which is arranged to be driven by the spindles 16.

As shown more clearly in Fig. 2, the frame 17 is provided with an opening 21 for each of the spindles 16, and through which the lower end of the spindle projects. The spindle is provided with a longitudinally-extending bore 22, which receives the upper end of the driving shaft 20, as clearly shown in Fig. 2. At the lower end of the spindle, there are cooperating means between the driving shaft and the spindle for supporting the shaft and for effecting a driving connection between the spindle and the shaft. The lower end of the spindle is provided with two portions 23 and 24 of reduced diameter and these portions are provided with slots 25 and 26 at right angles to each other. The shaft 20 is provided with lugs 27 diametrically positioned on opposite sides of the shaft and which are adapted to be received in either one of the slots 25 or 26 so that the shaft 20 will be keyed to the spindle in driving relation with it. Surrounding the reduced section 24 is a spring 28 in the form of a broken ring which is held in its assembled relation with reference to the spindle by means of a collar 29 which is attached to the reduced section 23, and which is provided with an inwardly extending flange 30 at the bottom so as to support the ring 28 in the reduced section 24. This flange 30 is slotted to conform with the slots 25 and 26. It will be understood that when the shaft 20 is inserted the lugs 27 will expand the spring ring 28 until they are above the spring whereupon the spring will contract to its original shape and thereby hold the shaft in its operative position in the spindle. To disengage the shaft from the spindle it is merely necessary to pull downwardly on the shaft. This action causes the lugs to again expand the ring so as to permit the lugs to be withdrawn. The coupling means is described and claimed in the copending application of William F. Allenby, Serial No. 333,179, filed May 3, 1940, and assigned to the same assignee as this invention.

The means, arranged in accordance with this invention, for preventing the food mixture from working up the shaft and into the frame and spindle, comprises a flange-like member 31. This member is rigidly secured to the shaft 20 so that when the shaft 20 is connected with the driving spindle, as shown in Fig. 2, it will be located directly under the bottom wall of the frame, or rotated so close to it that any food mixture tending to work up will be interrupted by the member and prevented from entering between the member and the frame. Preferably, the member 31 will be given a cup-shape having a concave upper surface and a convex lower surface, as shown. This cup-shaped member is positioned so that it encloses or covers the lower protruding end of the spindle, and so that its upper edge rotates so closely to the bottom wall of the frame as to substantially prevent the passage of food materials into the cup.

The guard 31 may be secured to the shaft 20 in any suitable manner as by welding. For this purpose, it is provided with a depending neck 32 which closely fits the shaft and which is welded directly to it.

In the form of my invention shown in Fig. 5, the shaft 33 is provided with a cup-shaped guard 34. In this case, the frame 35 is provided with a circular recess 36 in which the upper edge of the guard rotates. This further assures the prevention of any food mixture from entering the frame or driving spindle.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A mixing device comprising a frame, a vertically positioned hollow driving spindle housed within said frame, said frame having an opening in its lower wall for the lower end of said spindle and through which said spindle projects, a beater tool comprising a beater element, and a shaft attached to said element, cooperating means between said shaft and spindle for effecting a driving connection between the spindle and shaft, a circular cup-shaped guard attached to said shaft closing the lower end of said spindle and having its upper edge located in a circular recess provided for it in said lower wall around said spindle.

2. A mixing device comprising a frame provided with an opening therein, a vertically positioned spindle within said frame rotatable in the axis of said opening, a beater element provided with an operating shaft, means for effecting a driving connection between said shaft and spindle, and a guard on said shaft having a circular peripheral section adapted to rotate in a circular recess provided for it in said frame.

HARRY L. STILES.